United States Patent
Debata et al.

(10) Patent No.: US 12,489,670 B2
(45) Date of Patent: Dec. 2, 2025

(54) APPROACH TO SEAMLESSLY PROVISION IOMs NPAR CONFIGURATIONS FOR ONE OR MORE ASSOCIATED SLED(S) DURING COMPONENT OR SUBSYSTEM FAILURE FOR Mx7k CHASSIS IN DATACENTER

(71) Applicant: DELL PRODUCTS L.P., Round Rock, TX (US)

(72) Inventors: Smruti Ranjan Debata, Bangalore (IN); Akbar Sheriff, Salem (IN)

(73) Assignee: DELL PRODUCTS L.P., Round Rock, TX (US)

( * ) Notice: Subject to any disclaimer, the term of this patent is extended or adjusted under 35 U.S.C. 154(b) by 538 days.

(21) Appl. No.: 17/965,918

(22) Filed: Oct. 14, 2022

(65) Prior Publication Data
US 2024/0129180 A1   Apr. 18, 2024

(51) Int. Cl.
*H04L 12/00* (2006.01)
*H04L 41/0631* (2022.01)
*H04L 41/0659* (2022.01)

(52) U.S. Cl.
CPC ...... *H04L 41/0661* (2023.05); *H04L 41/0631* (2013.01)

(58) Field of Classification Search
CPC .......... H04L 41/0661; H04L 41/0631; H04L 41/0895; H04L 41/40; H04L 41/0816; H04L 41/0836; H04L 63/1441; G06F 21/55; G06F 11/203; H04M 3/2254; H04W 28/20
USPC .......................................................... 370/216
See application file for complete search history.

(56) References Cited

U.S. PATENT DOCUMENTS

| | | | |
|---|---|---|---|
| 5,696,809 A | * | 12/1997 | Voit .................... H04M 3/2254 379/267 |
| 8,429,630 B2 | | 4/2013 | Nickolov et al. |
| 9,277,370 B2 | | 3/2016 | Addepalli et al. |
| 9,325,525 B2 | | 4/2016 | Goel et al. |

(Continued)

FOREIGN PATENT DOCUMENTS

| | | | | |
|---|---|---|---|---|
| JP | 2000209203 A | * | 7/2000 | ......... H04L 41/0654 |
| JP | 2006135686 A | * | 5/2006 | ............. G06F 17/55 |

(Continued)

OTHER PUBLICATIONS

Lee et al., IN-202141013448-A,, Method for handling failure in network slice management, involves updating user equipment (UE) route selection policy (URSP), 2022, 3 pages (Year: 2022).*

(Continued)

*Primary Examiner* — Frantz Coby
(74) *Attorney, Agent, or Firm* — Jackson Walker LLP; Christopher J. Rourk

(57) ABSTRACT

A system for component failure management, comprising a plurality of hardware components disposed in a hardware rack and configured to process network data traffic and to generate hardware event data, an event manager coupled to the plurality of hardware components and configured to monitor the network traffic and hardware event data and to determine whether a hardware failure has occurred and a network optimization module coupled to the event manager and configured to determine whether a network partition update is required in response to the determination that a hardware failure has occurred.

20 Claims, 2 Drawing Sheets

(56) References Cited

U.S. PATENT DOCUMENTS

| | | | |
|---|---|---|---|
| 9,465,704 B2* | 10/2016 | Ganesan | G06F 11/203 |
| 9,491,201 B2 | 11/2016 | Bagepalli et al. | |
| 9,715,222 B2 | 7/2017 | Zimmermann et al. | |
| 10,735,891 B1* | 8/2020 | Trim | H04W 28/20 |
| 10,824,409 B2 | 11/2020 | Arumugam et al. | |
| 10,992,576 B1 | 4/2021 | Panchal et al. | |
| 11,456,966 B2 | 9/2022 | Guim Bernat et al. | |
| 2008/0034425 A1* | 2/2008 | Overcash | G06F 21/55 |
| | | | 726/22 |
| 2019/0297118 A1* | 9/2019 | Haugsnes | H04L 63/1441 |
| 2019/0356736 A1 | 11/2019 | Narayanaswamy et al. | |
| 2020/0059459 A1 | 2/2020 | Abraham et al. | |

FOREIGN PATENT DOCUMENTS

| | | | | |
|---|---|---|---|---|
| JP | 2010225779 A | * | 10/2010 | G06F 17/55 |
| JP | 2022135377 A | * | 9/2022 | G05B 23/0221 |

OTHER PUBLICATIONS

Nagamitsu Shoichi, JP 2022135377 A, Center, Update Control Method, Update Control Program, OTA Master, Software Update System, 2022, 34 pages (Year: 2022).*

* cited by examiner

APPROACH TO SEAMLESSLY PROVISION IOMs NPAR CONFIGURATIONS FOR ONE OR MORE ASSOCIATED SLED(S) DURING COMPONENT OR SUBSYSTEM FAILURE FOR Mx7k CHASSIS IN DATACENTER

TECHNICAL FIELD

The present disclosure relates generally to network management, and more specifically to an approach to seamlessly provision input/output modules (IOMs) network partition (NPAR) configurations for one or more associated sled(s) during component or subsystem failure for an Mx7k chassis in a datacenter or other suitable systems or components.

BACKGROUND OF THE INVENTION

When hardware components fail, a non-optimal network configuration can exist that existing systems and components are unable to correct.

SUMMARY OF THE INVENTION

A system for component failure management is disclosed that includes a plurality of hardware components disposed in a hardware rack and configured to process network data traffic and to generate hardware event data. An event manager is coupled to the plurality of hardware components and is configured to monitor the network traffic and hardware event data and to determine whether a hardware failure has occurred. A network optimization module is coupled to the event manager and is configured to determine whether a network partition update is required in response to the determination that a hardware failure has occurred.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings may be to scale, but emphasis is placed upon clearly illustrating the principles of the present disclosure. Moreover, in the drawings, like reference numerals designate corresponding parts throughout the several views, and in which.

DETAILED DESCRIPTION OF THE INVENTION

Figure 1:
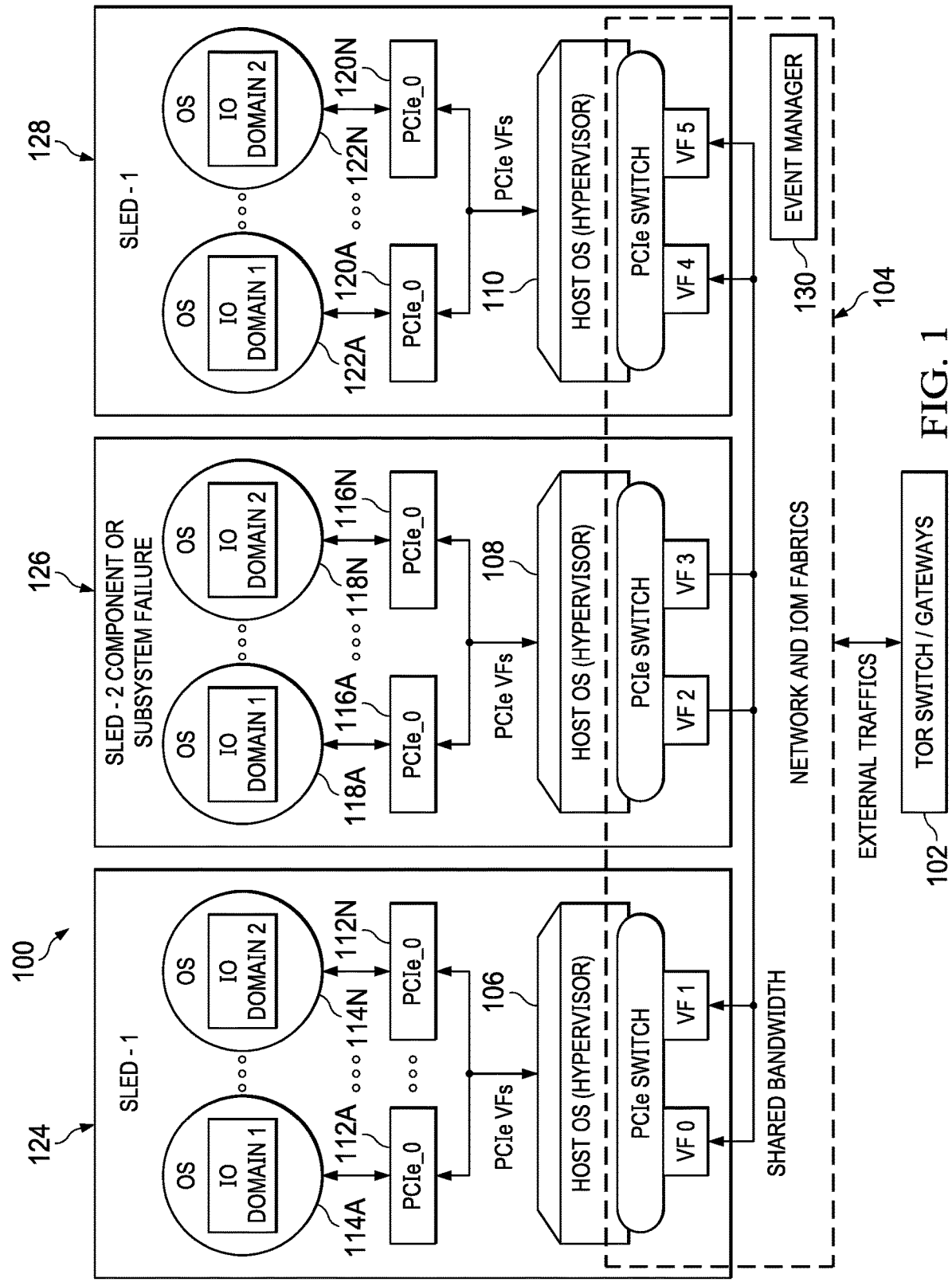
FIG. 1 is a diagram of a system for host network optimization, in accordance with an example embodiment of the present disclosure.

In the description that follows, like parts are marked throughout the specification and drawings with the same reference numerals. The drawing figures may be to scale and certain components can be shown in generalized or schematic form and identified by commercial designations in the interest of clarity and conciseness.

IOM NPAR configurations are typically manually performed. For example, the bandwidth allocation to the host virtual machines (VMs) and containers via the respective mezzanine board network interface card (NIC) will expose peripheral component interconnect express (PCIe) functions for different types of network traffic, such as Internet small computer systems interface (iSCSI), fiber channel over Ethernet (FCoE), Ethernet and so forth. These channels must each be manually configured by an administrator and are static by nature.

Inefficient use of chassis resources can result from unused assigned port partitions, such as for sleds (groups of components with common infrastructure) that are having hardware failures. These resources are typically manually claimed and re-mapped, because the hardware replacement time is unknown and uncertain.

Incorrect allocation of the IOM port partitions bandwidths for respective host-exposed PCIe functions causes uneven distribution of network load across sleds. This uneven distribution impacts both full switch mode or fabric mode of operation, which can result in transmission delay or packet drop situations and a degrading overall quality of service (QoS) for the chassis.

At present, seamless IOM NPAR configuration updating based on a real-time network traffic analysis from management modules does not exist. This condition results in the inability of management modules to determine host workloads across sleds in order to modify IOM NPAR configurations, such as in the event of a hardware failure within or across chassis components or subsystems, or to evenly balance the network load.

The present disclosure provides systems and methods to update and optimize NPAR configurations within or across a chassis during a component or subsystem failure event or incident. In one example embodiment, a host network optimization (HNO) management module is provided that is configured to run as a low priority daemon service and to work in conjunction with existing event manager services. Any critical events related to hardware failure are forwarded to the HNO service, which is configured to update port partition bandwidths and other related IOM NPAR parameters within or across the chassis. Network metrics can be exposed using APIs to generate time series data and to get network utilization, such as from VMs or container runtime instances, as well as the mappings to one or more PCIe functions such as virtual network interfaces for a specified time range.

In another example embodiment, the HNO management module can be configured to calculate available network headroom, bandwidth or other suitable parameters, such as after hardware failure for one or more sleds, for assigned port partition configurations for those sleds or for other suitable components. The HNO management module can be further configured to identify and isolate IO seeking virtual instances (such as VMs or containers) and its mapped NPAR port partitions from exposed APIs, can calibrate or update identified port partitions configurations to a higher limit for IO seeking virtual instances, and can perform other suitable functions.

Upon receiving critical hardware failure alerts, the HNO management module can perform an impact assessment, such as to obtain a network bandwidth percentage for any failed sleds. The HNO management module can also order port partitions and assign a weight to each partition, as a function of real-time utilizations and usage data for a time range received from any APIs. The time range to receive data can be configured at a suitable level.

In another example embodiment, the HNO management module can calculate a weighted average for all port partitions, such as to include a percentage of the additional value to the existing allocated bandwidth following a single port partition, and can repeat the process for other partitions to identify an optimal partition or for other suitable purposes. In this manner, new NPAR configurations can be identified and updated for active and assigned virtual instances to take advantage of unused bandwidth. The HNO management module can be further configured to listen to event manager to accommodate an addition or replacement associated with one or more sled slots, to revert any changes and to reassign the NPAR bandwidth and other configurations for the sleds.

The present disclosure provides real-time IOM NPAR configuration update functionality using the HNO management module to re-calibrate network bandwidth and other related parameters during hardware failure situations within or across chassis setup. In addition, the disclosed systems and algorithms can be used to retrieve host network utilizations and isolate resources that are seeking virtual port partitions to configure bandwidth and other related parameters. The seamless reversal of updated configurations to respective port partitions upon hardware replacement can also be provided.

FIG. 1 is a diagram of a system 100 for host network optimization, in accordance with an example embodiment of the present disclosure. System 100 includes top of rack switch 102, event manager 130 and network and IOM fabrics management module 104, which includes sled 1 124, sled 2 126 and sled 3 128. Sled 1 124 includes host processor 106, PCIe 112A-112N and OS 114A-114N. Sled 2 126 includes host processor 108, PCIe 116A-116N and OS 118A-118N. Sled 3 128 includes host processor 110, PCIe 120A-120N and OS 122A-122N.

Top of rack switch 102 can be implemented in hardware or a suitable combination of hardware and software and can be configured to provide a gateway between sled 1 124, sled 2 126, sled 3 128 and external systems. In one example embodiment, top of rack switch 102 can manage external traffic to and from network and IOM fabrics management module 104 and can provide other suitable functions.

Network and IOM fabrics management module 104 can be implemented in hardware or a suitable combination of hardware and software and can be configured to allow sleds to be added or removed as needed to provide modular network services. In one example embodiment, network and IOM fabrics management module 104 can perform host network optimization as discussed and described herein, such as to facilitate reconfiguration of the systems and components on different sleds, such as sled 1 124 and sled 3 128, in response to the failure of a component or subsystem on one sled, such as sled 2 126.

Sled 1 124 includes host processor 106, PCIe 112A-112N and OS 114A-114N, each of which can be implemented in hardware or a suitable combination of hardware and software and can be configured to provide network services requiring efficient use of data transmission bandwidth, such as to VMs and containers via the respective mezzanine board NIC, for iSCSI, FCoE, Ethernet and other network traffic. Processor 106 of sled 1 124 includes a host OS or hypervisor, a PCIe switch with virtual functions (VF) 0 and 1, and other suitable systems and components. PCIe VFs 0 and 1 can be implemented using PCIe 112A-112N, OS IO domains associated with OS 114A-114N and other suitable systems and components Sled 2 126 includes host processor 108, PCIe 116A-116N and OS 118A-118N, each of which can be implemented in hardware or a suitable combination of hardware and software and can be configured to provide network services requiring efficient use of data transmission bandwidth, such as to VMs and containers via the respective mezzanine board NIC, for iSCSI, FCoE, Ethernet and other network traffic. Processor 108 of sled 2 126 includes a host OS or hypervisor, a PCIe switch with VF 2 and 3, and other suitable systems and components. PCIe VFs 2 and 3 can be implemented using PCIe 116A-116N, OS IO domains associated with OS 118A-118N and other suitable systems and components.

Sled 3 128 includes host processor 110, PCIe 120A-120N and OS 122A-122N, each of which can be implemented in hardware or a suitable combination of hardware and software and can be configured to provide network services requiring efficient use of data transmission bandwidth, such as to VMs and containers via the respective mezzanine board NIC, for iSCSI, FCoE, Ethernet and other network traffic. Processor 110 of sled 3 128 includes a host OS or hypervisor, a PCIe switch with VF 4 and 5, and other suitable systems and components. PCIe VFs 4 and 5 can be implemented using PCIe 120A-120N, OS IO domains associated with OS 122A-122N and other suitable systems and components.

Event manager 130 can be implemented in hardware or a suitable combination of hardware and software and can be configured to generate alerts or to perform other suitable functions, as discussed and disclosed herein.

In operation, network and IOM fabrics management module 104 can implement host network optimization in the event of failure of systems or components, as discussed and described further herein.

Figure 2:
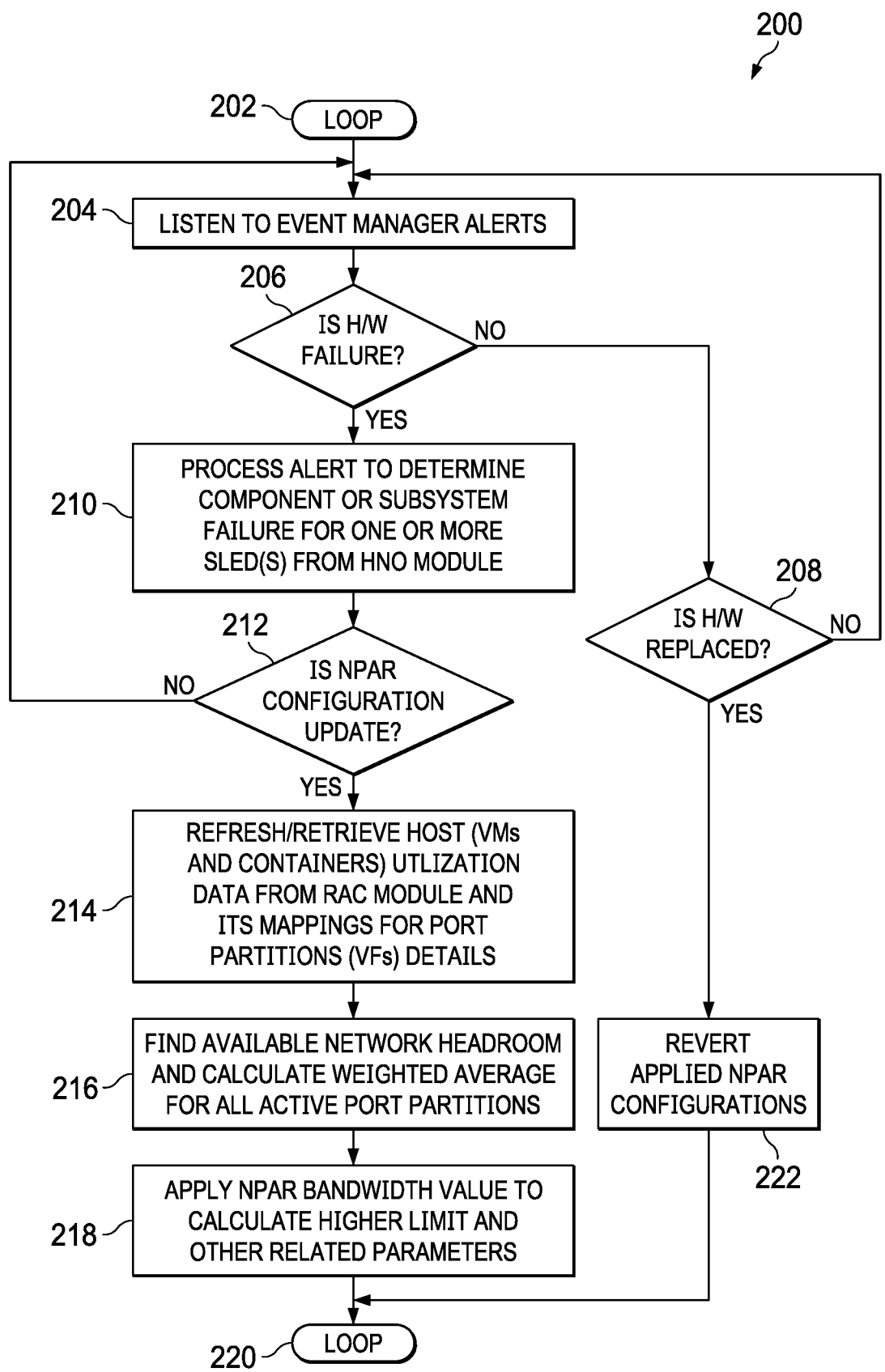
FIG. 2 is an algorithm for host network optimization, in accordance with an example embodiment of the present disclosure.

FIG. 2 is an algorithm 200 for host network optimization, in accordance with an example embodiment of the present disclosure. Algorithm 200 can be implemented in hardware or a suitable combination of hardware and software, and can operate in conjunction with network and IOM fabrics management module 104 or other suitable systems and components to implement host network optimization in the event of failure of systems or components, as discussed and described further herein.

Algorithm 200 begins at 202, where a loop is instantiated. In one example embodiment, the loop can be instantiated by an event manager or other suitable systems or components. The algorithm then proceeds to 204.

At 204, event manager alerts are reviewed to determine whether a hardware failure or replacement has occurred. The algorithm then proceeds to 206.

At 206, it is determined whether a hardware failure has occurred. If it is determined that a hardware failure has occurred, the algorithm proceeds to 206, otherwise the algorithm proceeds to 208.

At 208, it is determined whether hardware has been replaced. If it is determined that hardware has been replaced, the algorithm proceeds to 222, otherwise the algorithm returns to 202.

At 210, the alert is processed to determine whether a component or subsystem failure has occurred for one or more sleds from an HNO management module or other suitable systems or components, as discussed and described further herein. The algorithm then proceeds to 212.

At 212, it is determined whether an NPAR configuration update is required. If it is determined that an NPAR configuration update is required, the algorithm proceeds to 214, otherwise the algorithm returns to 204.

At 214, the host utilization data for VMs and containers is refreshed or retrieved from a controller, such as a remote access controller module or other suitable sources, in addition to mappings for port partitions details for VF or other suitable data. The algorithm then proceeds to 216.

At 216, available network headroom that exits is identified and a weighted average is calculated for all active port partitions. The algorithm then proceeds to 218.

At 218, the NPAR bandwidth value is applied to the calculated weighted average higher limit, and other related parameters as discussed and described herein. The algorithm then proceeds to 220.

At 220, the algorithm completes the loop, returns to the initiation of the loop at 202 or other suitable processes are also or alternatively implemented.

At 222, applied NPAR configurations are reverted as discussed further herein, or other suitable processes are also or alternatively implemented. The algorithm then proceeds to 206.

In operation, algorithm 200 can be used to provide host network optimization or other suitable functions. Although algorithm 200 is shown as a flow chart, a person of skill in the art will recognize that it can also or alternatively be implemented using object oriented programming, state diagrams, ladder diagrams, other suitable programming paradigms or a combination of programming paradigms.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes one or more microcomputers or other suitable data processing units, memory devices, input-output devices, displays, data input devices such as a keyboard or a mouse, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections. The term "data" can refer to a suitable structure for using, conveying or storing data, such as a data field, a data buffer, a data message having the data value and sender/receiver address data, a control message having the data value and one or more operators that cause the receiving system or component to perform a function using the data, or other suitable hardware or software components for the electronic processing of data.

In general, a software system is a system that operates on a processor to perform predetermined functions in response to predetermined data fields. A software system is typically created as an algorithmic source code by a human programmer, and the source code algorithm is then compiled into a machine language algorithm with the source code algorithm functions, and linked to the specific input/output devices, dynamic link libraries and other specific hardware and software components of a processor, which converts the processor from a general purpose processor into a specific purpose processor. This well-known process for implementing an algorithm using a processor should require no explanation for one of even rudimentary skill in the art. For example, a system can be defined by the function it performs and the data fields that it performs the function on. As used herein, a NAME system, where NAME is typically the name of the general function that is performed by the system, refers to a software system that is configured to operate on a processor and to perform the disclosed function on the disclosed data fields. A system can receive one or more data inputs, such as data fields, user-entered data, control data in response to a user prompt or other suitable data, and can determine an action to take based on an algorithm, such as to proceed to a next algorithmic step if data is received, to repeat a prompt if data is not received, to perform a mathematical operation on two data fields, to sort or display data fields or to perform other suitable well-known algorithmic functions. Unless a specific algorithm is disclosed, then any suitable algorithm that would be known to one of skill in the art for performing the function using the associated data fields is contemplated as falling within the scope of the disclosure. For example, a message system that generates a message that includes a sender address field, a recipient address field and a message field would encompass software operating on a processor that can obtain the sender address field, recipient address field and message field from a suitable system or device of the processor, such as a buffer device or buffer system, can assemble the sender address field, recipient address field and message field into a suitable electronic message format (such as an electronic mail message, a TCP/IP message or any other suitable message format that has a sender address field, a recipient address field and message field), and can transmit the electronic message using electronic messaging systems and devices of the processor over a communications medium, such as a network. One of ordinary skill in the art would be able to provide the specific coding for a specific application based on the foregoing disclosure, which is intended to set forth exemplary embodiments of the present disclosure, and not to provide a tutorial for someone having less than ordinary skill in the art, such as someone who is unfamiliar with programming or processors in a suitable programming language. A specific algorithm for performing a function can be provided in a flow chart form or in other suitable formats, where the data fields and associated functions can be set forth in an exemplary order of operations, where the order can be rearranged as suitable and is not intended to be limiting unless explicitly stated to be limiting.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:

1. A system for component failure management, comprising:
   a plurality of hardware components disposed in a hardware rack and configured to process network data traffic and to generate hardware event data;
   an event manager coupled to the plurality of hardware components and configured to monitor the network traffic and hardware event data and to determine whether a hardware failure of one or more of the hardware components has occurred; and
   a network optimization module coupled to the event manager and configured to determine whether a network partition update is required in response to the determination that the hardware failure has occurred.

2. The system of claim 1 wherein the plurality of hardware components are each configured to generate an event manager alert.

3. The system of claim 1 wherein the network partition update comprises a port partition update.

4. The system of claim 1 wherein the plurality of hardware components are each configured to provide a virtual function.

5. The system of claim 1 wherein the network optimization module is configured to determine whether one of the hardware components has been replaced.

6. The system of claim 1 wherein the network optimization module is configured to determine whether one of the hardware components has been replaced and to revert applied network partitions if it is determined that one of the hardware components has been replaced.

7. The system of claim 1 wherein the network optimization module is configured to identify available network headroom for the network partition update.

8. The system of claim 1 wherein the network optimization module is configured to identify available network headroom for the network partition update and to calculate a weighted average for all active partitions.

9. The system of claim 1 wherein the network optimization module is configured to calculate a weighted average for all active partitions.

10. The system of claim 1 wherein the network optimization module is configured to calculate a limit for all active partitions.

11. A method for component failure management, comprising:
    processing network data traffic using a plurality of hardware components disposed in a hardware rack;
    generating hardware event data using each of the hardware components;
    monitoring the network traffic and hardware event data using an event manager coupled to the plurality of hardware components;
    determining whether a hardware failure of one of the plurality of hardware components has occurred using the event manager; and
    determining whether a network partition update is required in response to the determination that the hardware failure has occurred using a network optimization module.

12. The method of claim 11 further comprising generating an event manager alert using one or more of the plurality of hardware components.

13. The method of claim 11 wherein the network partition update comprises a port partition update.

14. The method of claim 11 further comprising providing a virtual function using one or more of the plurality of hardware components.

15. The method of claim 11 further comprising determining whether one of the hardware components has been replaced.

16. The method of claim 11 further comprising:
    determining whether one of the hardware components has been replaced; and
    reverting applied network partitions if it is determined that one of the hardware components has been replaced.

17. The method of claim 11 further comprising identifying available network headroom for the network partition update.

18. The method of claim 11 further comprising:
    identifying available network headroom for the network partition update; and
    calculating a weighted average for all active partitions.

19. The method of claim 11 further comprising calculating a weighted average for all active partitions.

20. The method of claim 11 further comprising calculating a limit for all active partitions.

* * * * *